United States Patent [19]

Mollen et al.

[11] 3,795,094
[45] Mar. 5, 1974

[54] RIDING MOWER

[75] Inventors: Ignatius J. Mollen, Brillion; Phillip E. Koerper; Albert G. Turner, both of Brookfield; David S. Dewhurst, Wauwatosa, all of Wis.

[73] Assignee: Ariens Company, Brillon, Wis.

[22] Filed: Oct. 30, 1972

[21] Appl. No.: 302,176

[52] U.S. Cl............... 56/11.1, 56/11.2, 56/11.6, 56/15.3, 56/15.8, 56/16.3, 74/197
[51] Int. Cl............................................. A01d 35/26
[58] Field of Search ......... 56/11.1, 11.2, 11.6, 14.9, 56/15.3, 15.7–15.9, 16.3; 74/194, 197

[56] References Cited
UNITED STATES PATENTS
3,461,654  8/1969  Plamper............................. 56/11.6

*Primary Examiner*—Louis G. Mancene
*Assistant Examiner*—J. A. Oliff
*Attorney, Agent, or Firm*—Wheeler, Morsell, House & Wheeler

[57] ABSTRACT

A wheeled frame with tilting front axle has rack and pinion steering gear. A rear mounted prime mover with vertical shaft has separate pulleys for driving the vehicle through a friction disk rate changer and for driving the shaft of the centrally mounted mower.

The mower is bodily movable fore and aft for tightening the drive belt or relaxing it to interrupt the drive to the mower. The pan which houses the rotary mower can be adjusted vertically and can move vertically independently of adjustment without interfering with, or being affected by, the clutching fore and aft movement.

13 Claims, 7 Drawing Figures

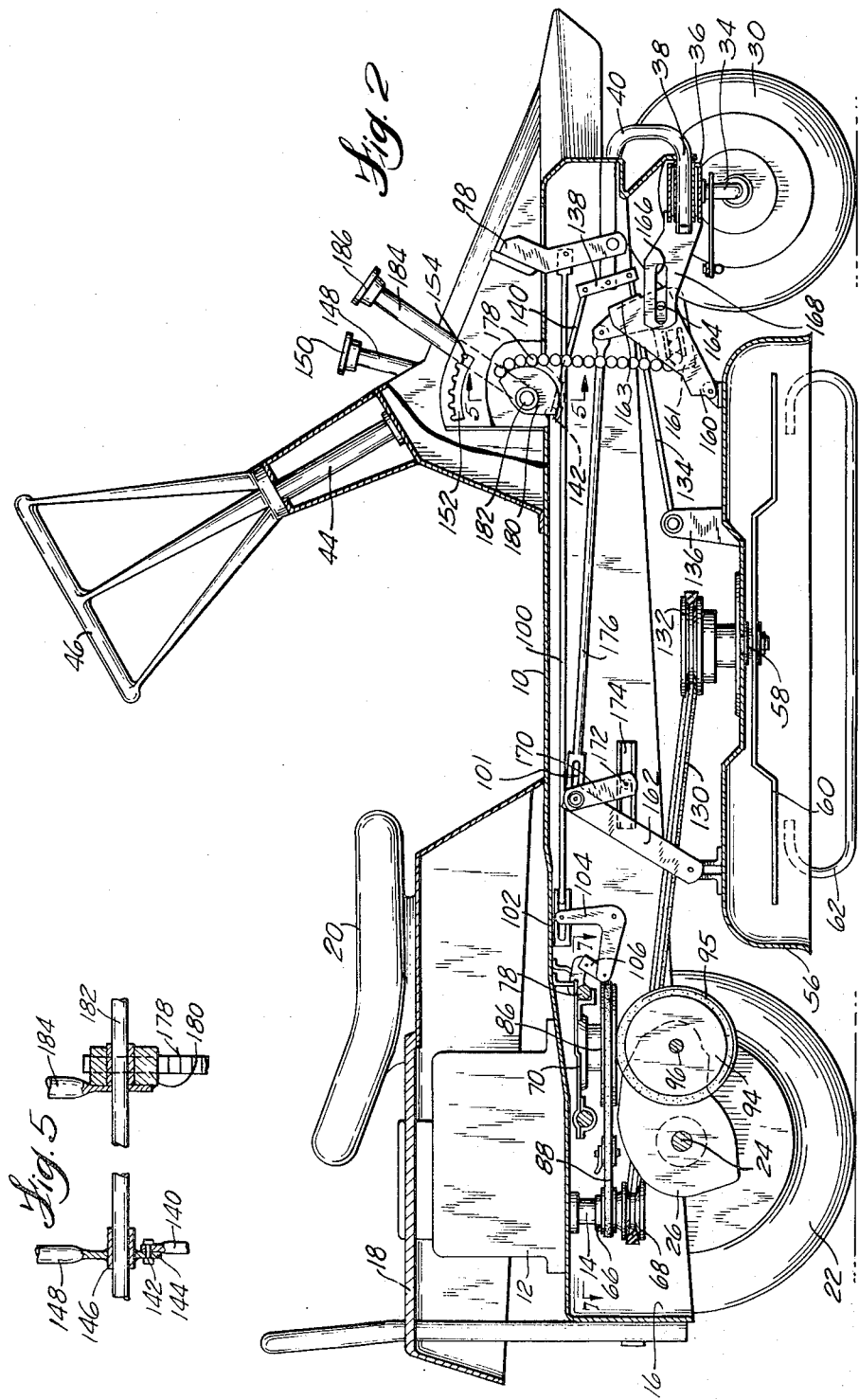

RIDING MOWER

This is a continuation of application Ser. No. 132,402 filed Apr. 8, 1971 and now abandoned.

BACKGROUND OF INVENTION

Past attempts to provide riding mowers with the various controls and adjustments of the instant device have involved mechanical organization much more complex than that herein disclosed.

SUMMARY OF INVENTION

The drive is varied in ratio by unclutching the driving disk and moving it in its own plane across the rim of the driven disk between various forward and reverse driving positions.

At the same time, the drive to the rotary blade of the mower may be engaged and disengaged when the belt from that shaft to the mower is tightened or declutched by bodily movement of the mower beneath the frame of the riding vehicle. Means is also provided for adjusting the blade vertically without interfering with bodily movement thereof for belt tightening and releasing purposes, independent movement of the pan also being accommmodated when irregular ground is traversed.

Individually dirigible front wheels are at the ends of a tiltable axle and have steering link connection actuated from the steering wheel of the vehicle by a rack and segmental gear.

BRIEF DESCRIPTION OF DRAWINGS

FIG. 2 is a view thereof on a larger scale in longitudinal section.

FIG. 5 is a detail view in section on line 5—5 in FIG. 2.

DETAILED DESCRIPTION

Figure 3:
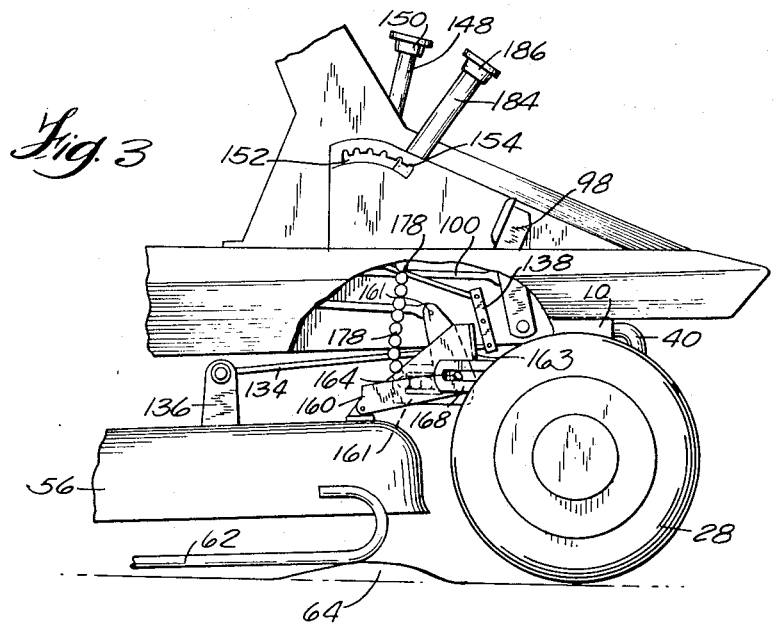
FIG. 3 is a fragmentary side elevation of the forward portion of the riding mower, parts being broken away.

The frame 10 has somewhat the form of an inverted channel to provide a housing for the operating parts. The prime mover 12 is only diagrammatically indicated. The drive shaft 14 projects downwardly into the cavity 16 of the frame 10. A casing 18 extends rearwardly over the motor 12. A seat 20 is provided for the operator.

Figure 7:
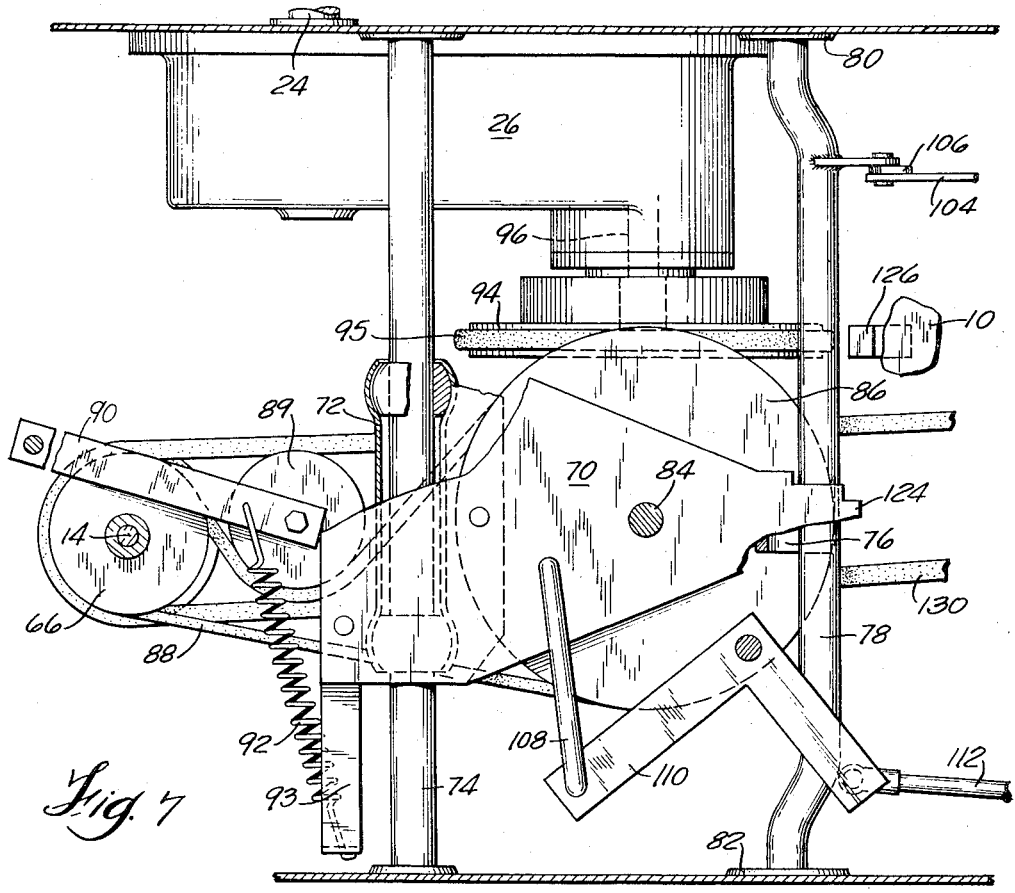
FIG. 7 shows the vehicle speed control mechanism in plan on the line 7—7 in FIG. 2, parts being broken away.
Figure 6:
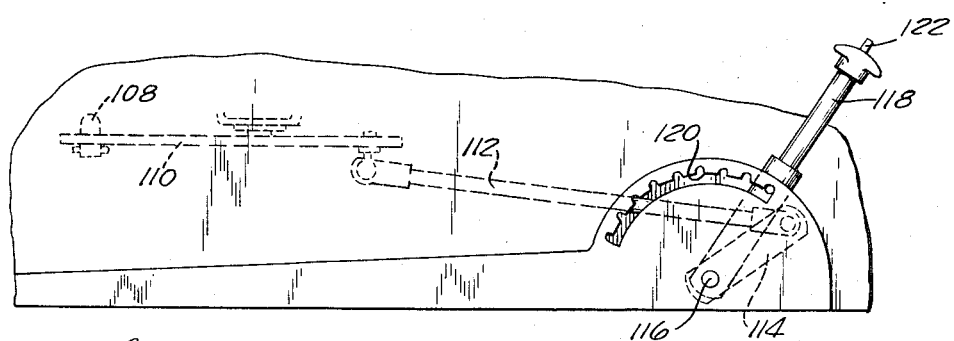
FIG. 6 is a fragmentary detail of vehicle speed control mechanism in side elevation.

The only rear wheel shown is the drive or bull wheel 22 mounted on a shaft 24 projecting laterally from the frame 10 as shown in FIG. 7. This shaft extends outwardly from the gear casing 26 mounted in the interior of the frame cavity 16 as best shown in FIGS. 2 and 7.

Figure 4:
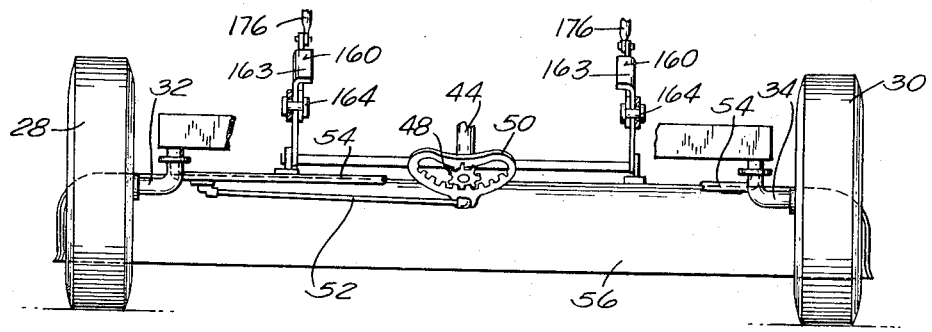
FIG. 4 is a fragmentary front elevation of the front axle.
Figure 1:
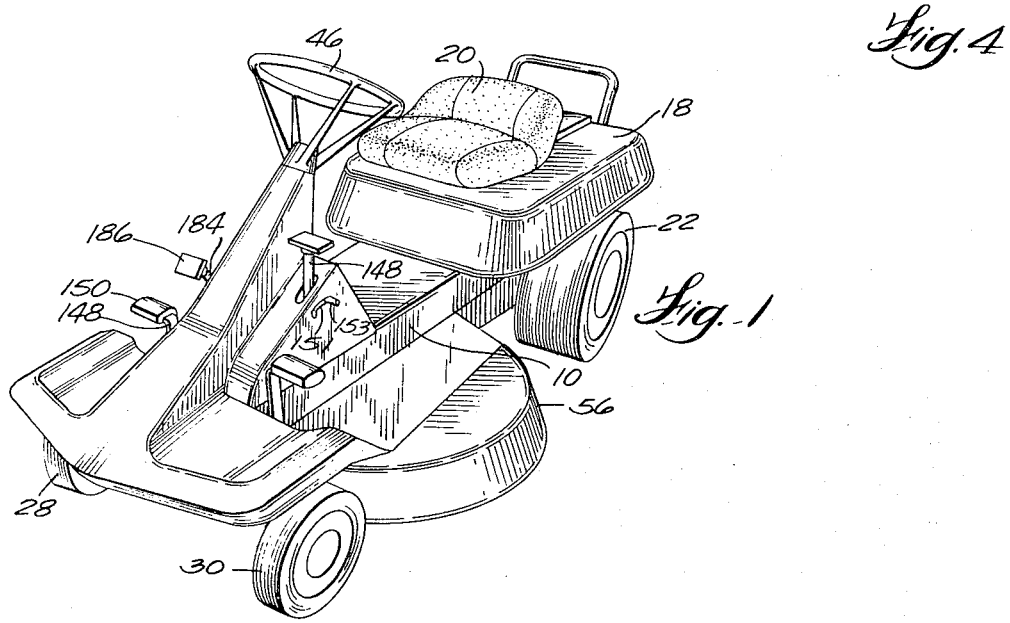
FIG. 1 is a small scale view of the riding mower in perspective.

The front wheels 28 and 30 are dirigibly mounted on the L-shaped shafts 32, 34, respectively, these being pivoted on the front axle 36 as best shown in FIG. 2. This front axle is pivoted for oscillation in a vertical plane on the bearing portion 38 of a U-shaped bar 40 rigidly connected with frame 10 near the center thereof. At or near the center line of the vehicle is the inclined steering shaft 44 which has steering wheel 46 on its upper end and is provided near its lower end with a pinion 48 meshing with gear segment 50 (FIG. 4). This segment is connected by link 52 to the dirigible axle 32 of wheel 28. Axle 32 has a tie bar 54 connecting it with the opposite dirigible axle 34 of wheel 30.

Disposed centrally between the front and rear wheels of frame 10 is the inverted pan or mower housing 56 which is provided centrally with a vertical drive shaft 58 for the rotary mower blade 60. The pan 56 is vertically adjustable not only to vary the cut also to the extent that it may be retracted from operative proximity to the earth. Means for this adjustment will hereinafter be described. The pan is also provided with lateral runners 62 which extend from front to rear in a position to lift the pan over such irregularities in the soil as are indicated at 64 in FIG. 3.

The means for adjustably supporting the pan and the means for driving the supporting vehicle at varying speeds will now be described. Both the vehicle drive and the cutting blade drive are taken from the motor shaft 14 by means of belts trained about the respective drive pulleys 66 and 68.

THE VEHICLE DRIVE

The carriage 70 (FIG. 7) is pivotally and slidably supported by means of the double bearing sleeve 72 which rides upon a bar 74 extending transversely across the interior of frame 10. The forward end of carriage 70 is provided with a slide block 76 which rides upon a cranked shaft 78 rotatably mounted at its ends in bearings 80 and 82 at opposite sides of the frame.

The carriage provides bearing support for the shaft 84 of a driven pulley 86. The belt 88 trained about the driving pulley 66 and about the pulley 86 transmits power to pulley 86, the latter also constituting the driving disk of a friction transmission of infinitely variable rates. A belt tightening pulley 89 is pivotally mounted on an arm 90 subject to the bias of tension spring 92 to hold belt 88 taut. The spring anchorage arm 93 is carried by, and moves with carriage 70. The face of pulley-disk 86 rests upon the non-metallic rim or tire portion 95 of the driven disk 94 which is mounted on the drive shaft 96 of transmission 26 whereby power is imparted to the bull wheel 22.

When the cranked supporting rock shaft 78 is oscillated against the slide block 76 at the front of carriage 70, the driving disk 86 is lifted from contact with the rim 95 of the driven disk 94, thus disengaging the drive to the wheel (or wheels). This serves the function of a clutch. The cranked rock shaft is actuated by clutch pedal 98 at the front of the frame 10, this pedal being connected by link 100 with a slotted slide member 102 providing a lost motion connection with bell crank 104, the latter being in driving connection through link 106 with the cranked rock shaft 78.

Shifting the carriage from side to side to vary the radial position in which the driving disk engages the rim 95 of the driven disk 94 results in a change of speed of the drive to the bull wheel 22. The disk 86, preferably being first disengaged by the described clutch mechanism from the rim, may then be moved laterally of the vehicle by means of link 108, bell crank 110, line 112, rocker arm 114, rock shaft 116 and hand lever 118, the latter being positioned within easy reach of an operator on seat 20 and being provided with a conventional segment 120 and release button 122 which releases a pawl, engageable with segment 120 to maintain the position of adjustment of the change speed mechanism.

The change speed mechanism also effects reverse, this result being brought about by moving the center line of driving disk 86 across the rim 95 of the driven disk 94. To avoid undue wear of the parts, arrangement is made for preventing contact between disks 86 and 94 when the disk 86 is centered over the driven disk. To this end, the carriage 70 has a projecting finger at 124 which has to pass over a fixed abutment 126 on the frame when the disk 86 is in centered position. This prevents disk 86 from being lowered onto disk 94 in that position. It may, however, be lowered when the finger 124 is at either side of stop 126 to effect the transmission of drive either forwardly or in reverse to the bull wheel.

It will be observed that the driving and driven disks are not in conventional arrangement. It is unusual to have the driven disk on a stationary axis and to move the driving disk back and forth across the face of the driven disk. For the purpose of this particular machine, there are considerable advantages in the arrangement described. For one thing, it is desirable to have the disk 94 remain in close proximity to the gear case 26. For another thing, it is quite advantageous, in this particular organization, to have the belt 88 and belt tightener in the same plane in which the disk 86 is reciprocable, whereby the belt can be driven directly without gearing from the drive pulley 66 on the prime mover shaft 14.

DRIVE TO MOWER HEAD

The drive pulley 68 is immediately below the drive pulley 66 on the prime mover shaft 14. Trained about pulley 68 is a belt 130 which is also trained about the pulley 132 on the shaft 58 which carries the mower head 60. While this belt extends downwardly at a slight angle when the mower head is in its lowest position as shown in FIG. 2, this operates satisfactorily. A clutching driving connection between the two pulleys is established or discontinued by bodily movement of the entire pan 56 and the mower head 60 and the pulley 132 forwardly and rearwardly in a direction longitudinally of the frame 10. When the belt is slack, the mower head is idle. When the belt is tight, the mower head is driven.

A major feature of the present invention is the accomplishment of this type of clutching arrangement in a device in which the entire pan and mower head may also be mechanically lifted bodily in horizontal position, or may tilt bodily in passing over ground obstacles, the belt tightening and relaxing mechanism being compatible with the means for independently accommodating these other movements of the pan. These will now be described.

PAN SUPPORT FOR UPWARD AND DOWNWARD TILTING AND FORE AND AFT MOVEMENTS

The clutching fore and aft movement of the pan 56 is effected by link 134 fixed to a standard 136 on the pan and connected at its forward end to a lever 138 (FIG. 3). A link 140 connects this lever 138 with a pin 142 on the arm 144 of rock sleeve 146 with which the clutch lever 148 is connected. This lever has a handle 150 at its upper end. Tension on handle 150 draws the entire pan 56 and cutter head 60 and pulley 132 forwardly to tension belt 130 and thereby to cause motion to be transmitted from the prime mover shaft 14 to the cutter head 60. A segment 151 is engaged by releasable pin 153 to maintain the desired tension on the belt. This conventional arrangement is not specifically shown nor does it need further description.

Release of pin 153 from segment 151 permits the arm 148 to move rearwardly (counterclockwise as shown in FIG. 2) thereby relaxing tension on the drive belt 130 to interrupt the drive to the mower head 60.

The mounting of the pan 56 and mower head is such as to accommodate the fore and aft belt clutching and de-clutching movement just described. At the same time, the mounting accommodates bodily vertical or bodily tilting movement. Support is provided for the pan by lever 160 bell crank means 161 at one end and bell crank means 162 at its other end. The lever 160 and the bell crank means 161 are both fulcrumed upon pintles which are slidably mounted. The bell crank means 161 has a pintle 164 which is slidable in the bearing channel 166 of the frame. The link 176 connects the two bell crank means 160 and 161 to cause them to oscillate concurrently about their respective pintles regardless of the location of the pintles in the bearing guides 166, 174 as above described. The bell crank means 161 is primarily actuated and the motion is transmitted therefrom to the bell crank means 162. Motion to lift the front of the pan is transmitted from bell crank 161 to the pan by lever 160 also pivoted on pin 164 and which has a flange 163 in the path of clockwise oscillation of bell crank 161. Actuation is accomplished by a flexible tension member 178 which, as illustrated in FIGS. 2 and 3, is a ball chain wound on a segment 180. This segment is fixed to a rock shaft 182 from which the lever 184 projects upwardly and is provided with a handle 186. The lever 184 carries a pin 154 releasably engaged in segment 152 which is conventional and hence needs no further description or illustration, the sole purpose being to hold the lever 184 in adjusted position to maintain the pan 56 and mower head 60 at its desired elevation.

At the same time, the device can be yieldable from the adjusted position if the runner 62 on the under side of the pan encounters an obstacle such as that shown at 64 in FIG. 3. In such an event, the pan tilts and the tilting is accommodated by the slackening of the flexible tension member 178. When the obstacle has been surmounted, the pan will restore itself by gravity to its original position as determined by the location of lever 184 and pin 154 with reference to segment 152. Flange 163 on lever 160 will be free of bell crank 161 in the elevated pan position shown in FIG. 3 but will reengage the bell crank to hold the pan in its original position of adjustment when the pan descends after passing the obstruction. Similar freedom of movement of the other end of the pan is accommodated by the lost motion permitted by slot 101 at the end of link 176 (FIG. 2).

It is to be observed that the movements of the pan as controlled by the operator are effected with the pan perfectly horizontal due to the design of the lever 160 and bell crank means 161 and bell crank means 162. It is also to be observed that these same adjustments can be effected regardless of the fore and aft positions to which the fulcrum pins 164 and 172 have been moved in the tightening or release of tension of the drive belt 130. It is also to be observed that the yielding of the pan and mower head does not disturb any of the described settings involving either belt tension or pan height.

We claim:

1. A vehicle-supported mower comprising a frame provided with wheels, a prime mover on the frame having a depending power shaft, first and second power shaft pulleys on said shaft, a rotary cutter blade supported from the frame, a variable ratio friction transmission comprising a driving disc and a driven disc, said driving disc comprising a pulley connected to said first power shaft pulley by a drive belt, said driving disc being mounted on a shaft substantially parallel to the power shaft of said prime mover and mounted on a carriage, said carriage being mounted on a pair of parallel bars for movement parallel to the plane of said driving disc and substantially at right angles to said power shaft, said driven disc having a periphery normally in driven engagement with the face of said driving disc, connections to transmit power from said driven disc to one of said wheels, one of said bars being provided with offset end portions, and means to oscillate said bar in a direction substantially parallel to said shafts about said offset end portions for lifting said driving disc face out of engagement with the periphery of said driven disc without affecting the belted connection with the power shaft.

2. The device of claim 1 further comprising means to move said carriage along said bars to move said driving disc with respect to said driven disc whereby to alter the ratio and direction of the driving connection therebetween.

3. The device of claim 2 further comprising a stop mounted on said frame in the path of said carriage, said stop being positioned with respect to said path to prevent movement of said carriage through a position in which the center of the driving disc is over the periphery of the driven disc except when said oscillatable bar is rotated around its offset portion to lift said carriage about said stop, thereby separating said discs in said position.

4. The device of claim 1 in which said rotary cutter blade is provided with a housing pan, a pulley drivingly secured to said rotary cutter blade, a belt drivingly connecting said second power shaft pulley with said cutter blade pulley, bearing means supporting said rotary blade and pulley on said housing pan, means to move said housing pan in a substantially horizontal plane toward and away from said second power shaft pulley to change the tension of said last mentioned belt to establish and disestablish a driving connection between said second power shaft pulley and said cutter blade pulley, and separate means to move said housing pan substantially vertically whereby to vary the height of the cutter blade from the ground without changing the distance of said housing pan from said second power shaft pulley, whereby to alter the cutting height of the mower without affecting the driving connection between said second power shaft pulley and said cutter blade pulley.

5. A mower according to claim 4 in which the means to move said housing pan vertically comprises lost motion means and said housing pan having a ground-engageable member adapted to lift said housing pan and blade over ground irregularities substantially vertically, said vertical motion being accommodated by said lost motion means.

6. A mower according to claim 5 in which the means to move said housing pan vertically comprises separate lifting means for forward and rearward portions of said housing, said lifting means being interconnected and adapted normally to keep the housing level and having separate lost motion connections whereby the housing may deviate from level in surmounting ground irregularities.

7. A mower according to claim 6 in which the lifting means for the housing comprises for and aft levers having fulcrums, said frame having fore and aft track means in which said fulcrums are slidable to have fore and aft movement for adjustment of tension of said last mentioned belt.

8. A mower according to claim 7 further comprising linkage connecting the fore and aft levers for transmission of motion from one lever to another in the operation of the means to move said housing pan vertically regardless of the position of the fulcrums of said levers in a fore and aft direction.

9. A mower according to claim 8 further comprising a manual belt tension adjuster having a connection to said housing for effecting fore and aft movement thereof and for thereby causing fore and aft movement of the fulcrums of said levers.

10. The device of claim 6 in which the lifting means comprises forward and rearward bell crank members having ends respectively pivotally connected with the housing and fulcrums respectively pivotally connected with the frame, the ends of the bell crank members pivotally connected with the housing being movable in a generally vertical direction for accommodating variations in the height of said cutter blade, and means for rotating said bell crank members about their respective fulcrums for regulating the height of the housing while normally maintaining it level, and lost motion means individual to respective bell crank members to accommodate ground induced variations in housing level, said housing being provided with ground contacting means.

11. A mower according to claim 10 in which said lifting means includes a manual control, the lost-motion means including a flexible connector leading from the manual control to one bell crank member and a slotted link from the said one bell crank member to the other ball crank member.

12. A mower according to claim 11, said frame being provided with fore and aft ways along which said fulcrums are slidable, said means to move the housing pan in a horizontal plane including a second manual control adapted to move the said bell crank members bodily in a fore and aft direction in said ways.

13. A mower comprising a frame having wheels for ground traverse, a rotary cutter head having a bearing support and a shaft mounted on the bearing support and provided with a driven pulley, a prime mover on the frame having driving connections including a substantially horizontal belt trained about said driven pulley, means carrying said bearing support from said frame and accommodating movement of said support in a substantially horizontal belt-tension-adjusting direction, means controlled by an operator to effect belt-tension adjusting movement of the bearing support and the rotary cutter head, and means effective in all positions of said bearing support in said horizontal tension-adjusting direction to move said cutter head substantially vertically respecting said frame and the ground traversed thereby, said means carrying said bearing support and accommodating movement in a horizontal belt-tension-adjusting direction being constructed to adjust belt tension sufficiently to selectively drive or uncouple said driven pulley from said belt in all vertically adjusted positions of said cutter head.

* * * * *

UNITED STATES PATENT OFFICE
CERTIFICATE OF CORRECTION

Patent No. 3,795,094     Dated March 5, 1974

Inventor(s) Ignatius Mollen et al.

It is certified that error appears in the above-identified patent and that said Letters Patent are hereby corrected as shown below:

Column 2, line 14, insert -- but --, between "cut also".

Signed and sealed this 1st day of October 1974.

(SEAL)
Attest:

McCOY M. GIBSON JR.
Attesting Officer

C. MARSHALL DANN
Commissioner of Patents